United States Patent [19]

Jansch

[11] Patent Number: 4,838,073
[45] Date of Patent: Jun. 13, 1989

[54] METHOD AND APPARATUS FOR DETECTING LEAKS

[76] Inventor: Manfred Jansch, Moorkamp 25, D-3008 Garbsen 5, Fed. Rep. of Germany

[21] Appl. No.: 174,236

[22] Filed: Mar. 28, 1988

[30] Foreign Application Priority Data

Mar. 30, 1987 [DE] Fed. Rep. of Germany ....... 3710443

[51] Int. Cl.⁴ ............................................. G01M 3/20
[52] U.S. Cl. ...................................... 73/40.7; 73/49.2
[58] Field of Search ............................... 73/40.7, 49.2

[56] References Cited

U.S. PATENT DOCUMENTS 4,055,984 11/1977 Marx .................................... 73/40.7
4,524,609 6/1985 Sharp .................................... 73/49.2

FOREIGN PATENT DOCUMENTS 2101702 7/1972 Fed. Rep. of Germany ....... 73/40.7
21134 2/1983 Japan .................................... 73/40.7
1182326 9/1985 U.S.S.R. ........................... 73/49.2 R
1298563 3/1987 U.S.S.R. ............................... 73/40.7

Primary Examiner—Stewart J. Levy
Assistant Examiner—Joseph W. Roskos
Attorney, Agent, or Firm—Guy McClung

[57] ABSTRACT

In a method of testing the gas-tightness of walls defining a closed chamber a hollow member of resiliently flexible material is inserted into the chamber. A liquid is introduced into the hollow member until the hollow member substantially fills the chamber. A test gas is then introduced into the space defined between the hollow member and the chamber walls. Escape of any test gas from the chamber is then sensed by loss of gas pressure in the chamber or the presence of test gas outside the chamber. The presence of the liquid-filled hollow member reduces the amount of test gas needed and the associated risks and cost. The chamber may be defined between segments of oil well pipe casing connected by threaded sockets or it may be the space within a tank.

14 Claims, 2 Drawing Sheets

METHOD AND APPARATUS FOR DETECTING LEAKS

FIELD OF THE INVENTION

This invention relates to a method and apparatus for detecting leaks.

BACKGROUND TO THE INVENTION

Various methods are known for detecting leaks. For example, to detect leaks at junctions between tubes or other hollow members, the region about the junction is commonly isolated to form a test chamber which is filed with a test gas under pressure. The pressure of the compressed gas is then monitored, a drop in pressure indicating a leak. In another test procedure for two interconnected tubular members, a test chamber within the members is formed by means of a shut-off tool and gas pressure is applied to the test chamber. A process of this kind and a tool for use in the process is described in German OS No. 30 30 665. In this process two spaced-apart annular seals of resilient material are axially compressed by respective pistons. This urges the seals radially outwardly hard against the walls of the interconnected tubular members, thereby forming a test chamber into which helium or other test gas is introduced under pressure. Instruments for detecting escaping test gas are connected to the outside of the tubular members circumjacent the test chamber.

The above test processes and apparatus have the disadvantage of requiring large quantities of test gas which has to be compressed to very high pressures. The combination of high pressure and large amounts of the test gas creates a significant hazard not only adjacent the test zone but also adjacent the source of the compressed gas and along the supply line extending between said source and the test zone. Furthermore, existing shut-off tools are only suitable for pipes and other elongate cavities that have a substantially uniform diameter. They are unsuitable for testing the gas-tightness of non-cylindrical or irregularly shaped structures such as tanks. Moreover, the danger inherent in a compressed gas leak test very significantly increases as the size of the tank to be tested increases. The normal response to this danger is to use a very low test pressure, but that in turn considerably reduces the value of the test.

SUMMARY OF THE INVENTION

It is an object of the invention to provide a method and apparatus for detecting leaks by means of a test gas under pressure that combines economy in the use of the test gas with reduced danger in performance of the test.

It is a further object of the invention to provide a method and apparatus that enables the pressure of the test gas in a chamber subject to a leak test to be increased whilst maintaining acceptable levels of risk during the performance of the test.

It is a yet further object of the invention to provide a method and apparatus for the leak test of a chamber by means of a test gas under pressure that enables the test gas to be used within a chamber of any shape, particularly of substantial cross-section, and at high pressure whilst maintaining acceptable levels of risk.

The present invention provides a method for detecting leaks, which method comprises:

(a) inserting a hollow member of resiliently flexible material into a chamber;

(b) introducing a liquid into the hollow member;

(c) introducing a test gas into the space defined between the hollow member and the wall of the chamber; and (d) sensing the escape of any test gas from the chamber.

In an alternative aspect the invention provides apparatus for detecting leaks, comprising:

(a) wall means defining a closed chamber:

(b) a hollow member of resiliently flexible material in the chamber;

(c) means for introducing a liquid into the hollow member;

(d) means for introducing a test gas into the space defined between the hollow member and the wall of the chamber, and (e) means for sensing the escape of test gas from the chamber.

In a more specific form, the invention provides apparatus for detecting leaks, comprising:

(a) a plurality pipes, (b) threaded sockets connecting the pipes end to end, (c) end caps connected to the free ends of the pipes, said pipes, threaded sockets and end caps together defining a closed chamber;

(d) a hollow member of resiliently flexible material in the chamber;

(e) a port in the hollow member for introducing a liquid into the hollow member;

(f) a port in one of the end caps for introducing a test gas into a space defined between the hollow member and the wall of the chamber; and (g) means for sensing the escape of any test gas from the chamber.

BRIEF DESCRIPTION OF PREFERRED FEATURES

The hollow member can advantageously be made of natural or synthetic rubber so that it can readily adapt itself to a wide variety of spatial shapes of chamber. The presence of the liquid-filled hollow member in the chamber reduces the quantities of test gas that have to be introduced into the chamber and hence the inherent dangers of the test. If, as is preferred, the amount of liquid introduced into the hollow member is such that the hollow member substantially fills the chamber, the amount of test gas that has to be introduced becomes very small, which significantly reduces the damage that is likely to occur if the structure under test fails and the likelihood of the consequential injury to the test personnel from flying fragments of chamber wall material. In consequence the pressure of the test gas can be increased significantly, if desired to well above 1000 bar. The high pressure can be developed within the apparatus under test, with consequential improvement in the safety of the cylinders of compressed test gas or compressors or other sources of compressed test gas and their supply lines to the apparatus under test. In addition there is an economic advantage flowing from the relatively small amounts of test gas that have to be used, and the relatively small cylinders of compressors or other gas sources that have to be used, this advantage being particularly significant where the test gas is helium or a mixture of helium with another gas.

BRIEF DESCRIPTION OF THE DRAWINGS

For a better understanding of the invention reference will now be made, by way of example, to the accompanying drawings, in which.

DETAILED DESCRIPTION OF EMBODIMENTS OF THE INVENTION

Figure 1:
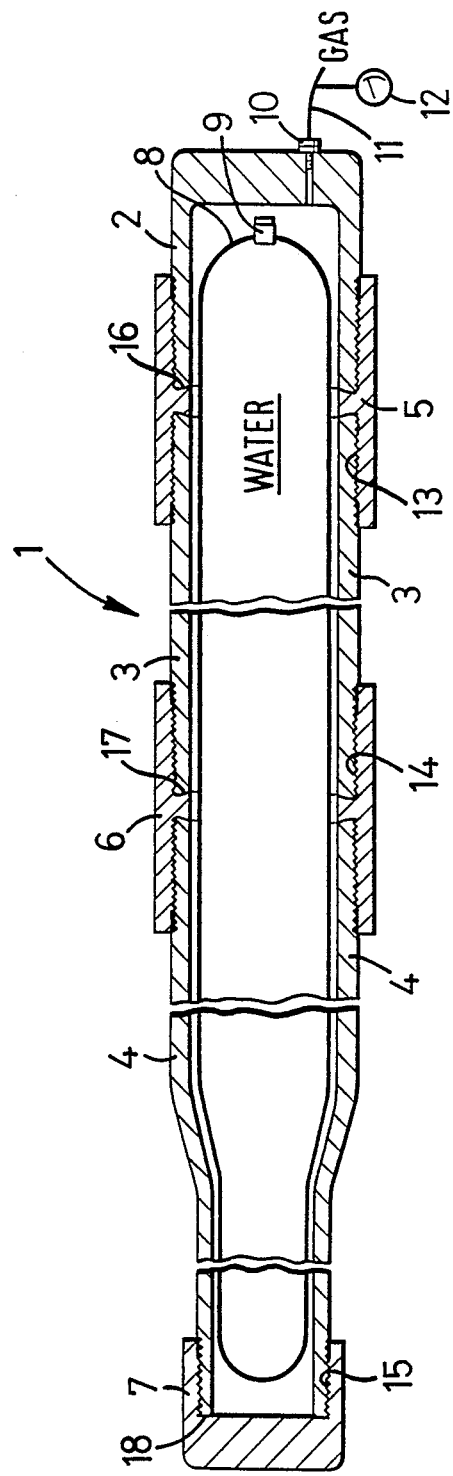
FIG. 1 is a diagrammatic section of an elongate hollow tubular member which is being subjected to a leak test.

Referring to FIG. 1 of the drawings, a tubular structure 1 to be leak tested comprises two sections 3, 4 that are connected by a threaded socket 6 and are closed by end caps 2 and 7 to define a closed chamber. End cap 2 is connected to the section 3 by a threaded socket 5.

A closed tubular member 8 made of rubber or other resiliently flexible material is present in the chamber of the tubular structure 1. The tubular member 8 carries on one end face a liquid supply and discharge port 9 through which water or other liquid can be introduced. The end cap 2 has a gas supply and discharge port 10 through which helium or other test gas can be introduced via a supply line 11 into the space between the inner surface of the tubular structure 1 and the outer surface of the tubular member 8. The pressure of the test gas can be monitored by means of a pressure gauge 12 in the gas supply line 11.

When sufficient liquid has been introduced into the interior of the tubular member 8, its walls are pressed tightly against the inner surfaces of the tubular sections 3, 4 and end caps 2, 7. Test gas is then introduced through gas supply and discharge port 10 to the space between the tubular member 8 and the inner surface of tubular structure 1. Introduction of the test gas is continued until the gas pressure is sufficient for it to be determined whether the tubular structure 1 is leaking.

Figure 2:
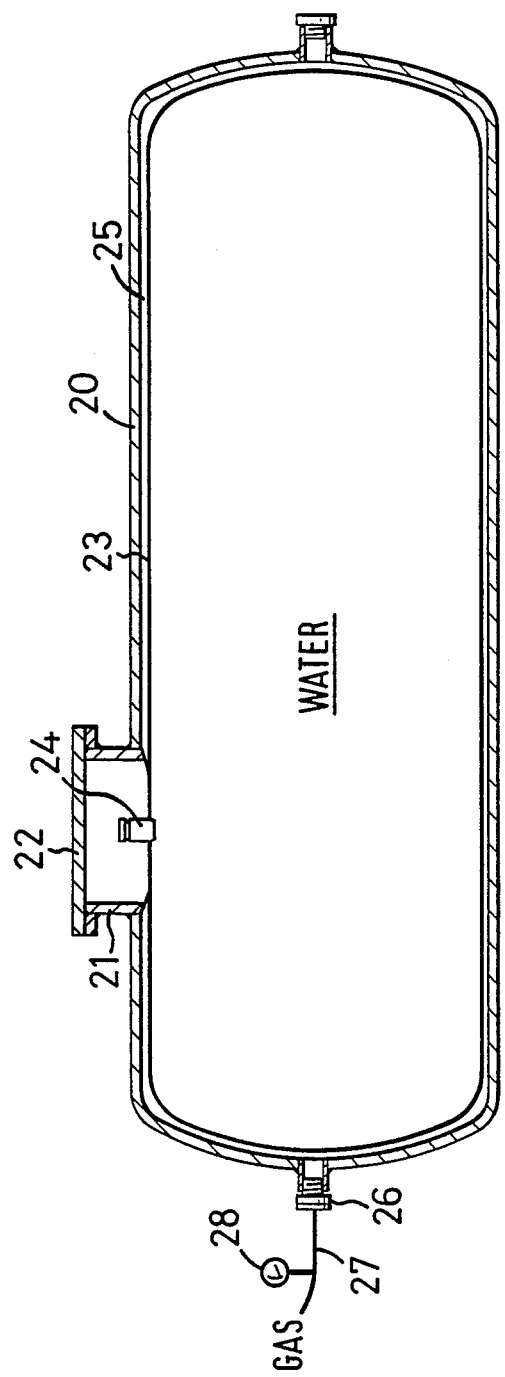
FIG. 2 is a diagrammatic section of a tank which is being subjected to a leak test.

In FIG. 2. a tank 20 has a port 21 closed by means of a cover 22. A hollow member 23 of rubber or other resiliently flexible material is disposed in the interior of the &and 20 and is filled with water via a liquid supply and discharge port 24. Supply of water to the hollow member 23 is continued until the hollow member 23 is in contact with substantially the whole inner surface of the tank 20. Gas supplied via line 27 is introduced through a gas supply and discharge port 26 on an end wall of the tank 20. The test gas flows into the space 25 between the hollow member 23 and the wall of the tank 20 to be tested until a pressure gauge 28 indicates that the pressure attained is sufficient for the test. The presence of the water in the hollow member 23 means that only a relatively small quantity of the high pressure test gas is needed. The small amount of test gas that enters this space is sufficient to indicate the presence of a leak e.g. at a weld seam. It will be noted that if the tank fails the volume of test gas released is insufficient to constitute a major danger to the people conducting the test.

The sections 3 and 4 may comprise adjacent lengths of oil well casing joined by a threaded socket.

I claim:

1. A method for detecting leaks, the method comprising
   inserting a hollow member of resiliently flexible material into a chamber;
   introducing a liquid under pressure into the hollow member;
   introducing a test gas into the space defined between the hollow member which contains the liquid under pressure and the wall of the chamber; and
   sensing the escape of any test gas from the chamber.

2. The method of claim 1 wherein the hollow member is of rubber.

3. The method of claim 1 wherein liquid is introduced into the hollow member through a filling aperture therein.

4. The method of claim 1 wherein the hollow member conforms generally to the internal shape of the chamber to be tested.

5. A method according to claim 1, wherein liquid is introduced into the hollow member until the hollow member substantially fills the chamber.

6. A method according to claim 1, wherein the liquid that is introduced into the hollow member is water.

7. A method according to claim 1, wherein the test gas comprises helium.

8. A method according to claim 1, wherein the test gas is introduced at a pressure of at least 1000 bar.

9. A method according to claim 1, wherein the escape of test gas is sensed by monitoring a fall in pressure of the gas in the chamber.

10. A method according to claim 1, wherein the escape of test gas is sensed by monitoring a fall in pressure in a supply line leading to the chamber.

11. A method according to claim 1, wherein the escape of test gas is sensed by detecting the presence of test gas outside the chamber.

12. A method according to claim 1, wherein the chamber being tested is non-cylindrical.

13. A method according to claim 1, wherein the amber being tested is a tank.

14. Apparatus for detecting leaks, comprising
   a plurality pipes;
   threaded sockets connecting the pipes end to end;
   end caps connected to the free ends of the pipes, said pipes, threaded sockets and end caps together defining a closed chamber;
   a hollow member of resiliently flexible material in the chamber;
   a port in the hollow member for introducing a liquid under pressure into the hollow member;
   a port in one of the end caps for introducing a test gas into a space defined between the hollow member containing the containing the liquid under pressure and the wall of the chamber; and
   means for sensing the escape of any test gas from the chamber.

* * * * *